(12) United States Patent
Grant et al.

(10) Patent No.: US 10,508,367 B2
(45) Date of Patent: Dec. 17, 2019

(54) BINARY ENCODING OF SENSORS IN TEXTILE STRUCTURES

(71) Applicants: North Carolina State University, Raleigh, NC (US); Carolon Company, Rural Hall, NC (US)

(72) Inventors: Edward Grant, Raleigh, NC (US); Frederick Jerard Livingston, Browns Summit, NC (US); Matthew David Craver, Durham, NC (US); Meghan Sarah Hegarty-Craver, Durham, NC (US); Lawrence Gibson Reid, Jr., Germanton, NC (US)

(73) Assignees: North Carolina State University, Raleigh, NC (US); Carolon Company, Rural Hall, NC (US)

( * ) Notice: Subject to any disclaimer, the term of this patent is extended or adjusted under 35 U.S.C. 154(b) by 326 days.

(21) Appl. No.: 15/444,008

(22) Filed: Feb. 27, 2017

(65) Prior Publication Data
US 2017/0233902 A1  Aug. 17, 2017

Related U.S. Application Data

(63) Continuation-in-part of application No. PCT/US2015/047188, filed on Aug. 27, 2015.
(Continued)

(51) Int. Cl.
*G01D 5/00* (2006.01)
*D03D 1/00* (2006.01)
(Continued)

(52) U.S. Cl.
CPC ............ *D03D 1/0088* (2013.01); *D02G 3/441* (2013.01); *D04B 1/16* (2013.01); *G01D 5/12* (2013.01);
(Continued)

(58) Field of Classification Search
CPC ........ D03D 1/0088; D02G 3/441; D04B 1/16; G01D 5/12; G01K 13/00; G06F 3/011; D10B 2401/16; D10B 2403/02431
(Continued)

(56) References Cited

U.S. PATENT DOCUMENTS

| 1,745,096 A | 1/1930 | Jayne |
| 2,073,933 A | 3/1937 | Herbst |

(Continued)

FOREIGN PATENT DOCUMENTS

| EP | 2 597 650 A1 | 5/2013 |
| WO | WO 2004/003273 A2 | 1/2004 |

OTHER PUBLICATIONS

Wang et al., "Electroactive polymers for sensing," Interface Focus, http://rsfs.royalsocietypublishing.org/content/6/4/20160026, vol. 6, pp. 1-19 (Jun. 17, 2016).

(Continued)

*Primary Examiner* — Max H Noori
*Assistant Examiner* — Masoud H Noori
(74) *Attorney, Agent, or Firm* — Jenkins, Wilson, Taylor & Hunt, P.A.

(57) ABSTRACT

A system with binary coding in a textile structure can include a textile sensor that senses a property and that has a yarn pattern. A binary code can be associated with the yarn pattern. When the textile sensor senses the property, the property alters relative positions of yarns in the yarn pattern, causing the associated binary code to change. A particular change in the binary code represents a defined value of the property. As a result, a second textile sensor having a second yarn pattern can be designed based on the unique binary codes of the first textile sensor measurements, such that the second textile sensor provides predictable responses to different property values.

30 Claims, 8 Drawing Sheets

Related U.S. Application Data (60) Provisional application No. 62/042,605, filed on Aug. 27, 2014.

(51) Int. Cl.
  *G01D 5/12* (2006.01)
  *G01K 13/00* (2006.01)
  *G06F 3/01* (2006.01)
  *D04B 1/16* (2006.01)
  *D02G 3/44* (2006.01)

(52) U.S. Cl.
  CPC .............. *G01K 13/00* (2013.01); *G06F 3/011* (2013.01); *D10B 2401/16* (2013.01); *D10B 2403/02431* (2013.01)

(58) Field of Classification Search
  USPC .......................................................... 73/828
  See application file for complete search history.

(56) References Cited

U.S. PATENT DOCUMENTS

| | | | |
|---|---|---|---|
| 2,387,783 A | 10/1945 | Tawney | |
| 2,854,639 A | 9/1958 | Nordlin | |
| 3,277,564 A | 10/1966 | Webber et al. | |
| 3,745,287 A | 7/1973 | Walker | |
| 3,795,760 A | 3/1974 | Raw et al. | |
| 3,933,520 A | 1/1976 | Gay et al. | |
| 4,091,176 A | 5/1978 | Alfenaar | |
| 4,129,677 A | 12/1978 | Boe | |
| 4,199,637 A | 4/1980 | Sado | |
| 4,247,596 A | 1/1981 | Yee | |
| 4,255,973 A | 3/1981 | Karplus | |
| 4,267,233 A | 5/1981 | Tanaka et al. | |
| 4,308,533 A | 12/1981 | Schmidt | |
| 4,350,580 A | 9/1982 | Kadija | |
| 4,417,959 A | 11/1983 | Kadija et al. | |
| 4,429,179 A | 1/1984 | Chynoweth | |
| 4,432,838 A | 2/1984 | Kadija | |
| 4,439,303 A | 3/1984 | Cocchi | |
| 4,460,803 A | 7/1984 | Piper | |
| 4,463,323 A | 7/1984 | Piper | |
| 4,552,989 A | 11/1985 | Sass | |
| 4,590,120 A | 5/1986 | Klein | |
| 4,639,825 A | 1/1987 | Breidegam | |
| 4,654,748 A | 3/1987 | Rees | |
| 4,661,376 A | 4/1987 | Liang | |
| 4,664,158 A | 5/1987 | Sands | |
| 4,664,971 A | 5/1987 | Soens | |
| 4,676,561 A | 6/1987 | Barrett, II | |
| 4,719,320 A | 1/1988 | Strait, Jr. | |
| 4,735,847 A | 4/1988 | Fujiwara et al. | |
| 4,742,847 A | 5/1988 | Bachot et al. | |
| 4,743,349 A | 5/1988 | Bachot et al. | |
| 4,803,096 A | 2/1989 | Kuhn et al. | |
| 4,820,170 A | 4/1989 | Redmond et al. | |
| 4,887,155 A * | 12/1989 | Massen ................ | D01G 31/006 348/88 |
| 4,889,963 A | 12/1989 | Onai | |
| 4,918,814 A | 4/1990 | Redmond et al. | |
| 4,929,803 A | 5/1990 | Yoshida et al. | |
| 4,931,616 A | 6/1990 | Usui et al. | |
| 4,937,401 A | 6/1990 | Lee | |
| 4,975,317 A | 12/1990 | Kuhn et al. | |
| 5,102,727 A | 4/1992 | Pittman et al. | |
| 5,162,135 A | 11/1992 | Gregory et al. | |
| 5,173,366 A | 12/1992 | Mitamura et al. | |
| 5,177,187 A | 1/1993 | MacDiarmid et al. | |
| RE34,233 E | 4/1993 | Bachot et al. | |
| 5,246,797 A | 9/1993 | Imhof et al. | |
| 5,248,468 A | 9/1993 | Mitamura et al. | |
| 5,281,171 A | 1/1994 | Job | |
| 5,292,573 A | 3/1994 | Adams, Jr. et al. | |
| 5,316,830 A | 5/1994 | Adams, Jr. et al. | |
| 5,398,547 A | 3/1995 | Gerardi et al. | |
| 5,420,465 A | 5/1995 | Wallace et al. | |
| 5,592,099 A | 1/1997 | Kuribara et al. | |
| 5,624,736 A | 4/1997 | DeAngelis et al. | |
| 5,636,378 A | 6/1997 | Griffith | |
| 5,689,791 A | 11/1997 | Swift | |
| 5,698,148 A | 12/1997 | Asher et al. | |
| 5,720,892 A | 3/1998 | DeAngelis et al. | |
| 5,776,608 A | 7/1998 | Asher et al. | |
| 5,788,897 A | 8/1998 | Hsu | |
| 5,802,607 A | 9/1998 | Triplette | |
| 5,834,639 A * | 11/1998 | Meier ................... | D01H 13/22 73/159 |
| 5,874,672 A | 2/1999 | Gerardl et al. | |
| 5,878,620 A | 3/1999 | Gilbert et al. | |
| 5,906,004 A | 5/1999 | Lebby et al. | |
| 6,044,287 A | 3/2000 | Cornell | |
| 6,051,335 A | 4/2000 | Dinh-Sybeldon et al. | |
| 6,080,690 A | 6/2000 | Lebby et al. | |
| 6,120,939 A | 9/2000 | Whear et al. | |
| 6,123,883 A | 9/2000 | Mattes et al. | |
| 6,145,551 A | 11/2000 | Jayaraman et al. | |
| 6,158,884 A | 12/2000 | Lebby et al. | |
| 6,210,771 B1 | 4/2001 | Post et al. | |
| 6,216,546 B1 | 4/2001 | Bahr | |
| 6,381,482 B1 | 4/2002 | Jayaraman et al. | |
| 6,388,188 B1 | 5/2002 | Harrison | |
| 6,687,523 B1 | 2/2004 | Jayaraman et al. | |
| 6,852,395 B2 | 2/2005 | Dhawan et al. | |
| 6,854,296 B1 | 2/2005 | Miller, III | |
| 7,064,299 B2 | 6/2006 | Green et al. | |
| 7,329,323 B2 | 2/2008 | Dhawan et al. | |
| 7,348,285 B2 | 3/2008 | Dhawan et al. | |
| 9,400,239 B2 | 7/2016 | Lemaster | |
| 2003/0006170 A1* | 1/2003 | Lawandy ............... | B07C 5/3412 209/3.3 |
| 2003/0119391 A1 | 6/2003 | Swallow et al. | |
| 2006/0037686 A1 | 2/2006 | Dhawan et al. | |
| 2006/0148351 A1 | 7/2006 | Tao et al. | |
| 2008/0009960 A1* | 1/2008 | Jinlian ................. | D03C 19/005 700/138 |
| 2008/0287022 A1 | 11/2008 | Dhawan et al. | |
| 2013/0340543 A1* | 12/2013 | Farahi .................... | G01D 21/00 73/866.1 |

OTHER PUBLICATIONS

Notification of Transmittal of the International Search Report and the Written Opinion of the International Searching Authority, or the Declaration for International Application No. PCT/US2015/047188 (Nov. 6, 2015).

"Simple Sous Vide," ITVirtuoso in Kitchen, https://www.instructables.com/id/Simple-Sous-Vide/, pp. 1-6 (Jan. 31, 2013).

Dunne, "Smart Clothing in Practice: Key Design Barriers to Commercialization," Fashion Practice, vol. 2, pp. 41-66 (2010).

"Interlink Electronics FSR™ Force Sensing Resistors™,"Integration Guide, FlipHTML5, www.Interlinkelectronics.com, pp. 1-37 (Sep. 23, 2010).

Non-Final Office Action for U.S. Appl. No. 12/053,889 (dated Jul. 6, 2009).

Restriction Requirement for U.S. Appl. No. 12/053,889 (dated Feb. 27, 2009).

Written Opinion for International Application No. PCT/US03/20461 (dated Feb. 4, 2009).

Notification of Transmittal of the International Search Report or the Declaration for International Application No. PCT/US03/20461 (dated Aug. 6, 2008).

Veblen, "Know your Knits," Threads, http://www.threadsmagazine.com/item/4160/know-your-knits/page/all, vol. 97, pp. 59-63 (Nov. 19, 2008).

Notice of Allowance and Fee(s) Due for U.S. Appl. No. 10/609,074 (dated Nov. 2, 2007).

Notice of Allowance and Fee(s) Due forU.S. Appl. No. 10/993,452 (dated Sep. 13, 2007).

Interview Summary for U.S. Appl. No. 10/609,074 (dated May 24, 2007).

(56) References Cited

OTHER PUBLICATIONS

Non-Final Office Action for U.S. Appl. No. 10/609,074 (dated Mar. 12, 2007).
Non-Final Office Action and Interview Summary for U.S. Appl. No. 10/993,452 (dated Jan. 9, 2007).
Non-Final Office Action for U.S. Appl. No. 10/993,452 (dated Sep. 27, 2006).
Advisory Action for U.S. Appl. No. 10/609,074 (dated Nov. 15, 2006).
Final Office Action for U.S. Appl. No. 10/609,074 (dated Jun. 28, 2006).
Non-Final Office Action for U.S. Appl. No. 10/609,074 (dated May 31, 2005).
Restriction Requirement for U.S. Appl. No. 10/609,074 (dated Mar. 29, 2005).
Notice of Allowance and Fee(s) Due and Interview Summary for U.S. Appl. No. 10/041,248 (dated Sep. 16, 2004).
Non-Final Office Action for U.S. Appl. No. 10/041,248 (dated Dec. 18, 2003).
Restriction Requirement for U.S. Appl. No. 10/041,248 (dated Sep. 23, 2003).
"Thin-Line™ Weld Heads—High Performance, Durability & Long Life 80 Series, 180 Series, 90 Series," Unitek Equipment, pp. 1-8 (Jul. 2001).
Post et al., "E-broidery: Design and Fabrication of Textile-Based Computing," IBM Systems Journal, vol. 39, pp. 840-860 (2000).
Gorlick, "Electric Suspenders: A Fabric Power Bus and Data Network for Wearable Digital Devices," The $3^{rd}$ International Symposium on Wearable Computers, pp. 114-121 (1998).
Post et al., "Smart Fabric, or 'Wearable Clothing,'" Proceedings of First International Symposium on Wearable Computers, pp. 167-168 (1997).
Inaba et al., "A Full-Body Tactile Sensor Suit Using Electrically Conductive Fabric and Strings," Proceedings of the IEEE/RSJ International Conference on Intelligent Robots and Systems, pp. 450-457 (1996).
"Unibond II—Advanced Microjoining System," Unitek Equipment, pp. 1-4 (Jul. 1995).
Tewksbury, "Interconnections Within Microelectronic Systems," Institute of Electrical and Electronics Engineers Press, pp. 3-49 (1994).
Azoulay, "Anisotropy in Electric Properties of Fabrics Containing New Conductive Fibers," IEEE Transactions on Electrical Insulation, vol. 23, No. 3, pp. 383-386 (1988).
Brews, "Transmission Line Models for Lossy Waveguide Interconnections in VLSI," IEEE Transactions on Electron Device, vol. 33, pp. 1356-1365 (1986).
Tewksbury, "Microelectronic System Interconnections—Performance and Modeling," IEEE Press (1994).

* cited by examiner

| | Binary Code |
|---|---|
| Single Jersey Stitch: | 1 0 1 0 |
| Miss Stitch: | 0 0 0 0 |
| Tuck Stitch: | 1 1 0 0 |

FIG. 4

| | | Wale 1 | Wale 2 | Wale 3 | Wale 4 | Wale 5 | Wale 6 | Wale 7 |
|---|---|---|---|---|---|---|---|---|
| Course 1 | Stitch | SJ | T | SJ | T | SJ | T | SJ |
| | Code | 1010 | 1100 | 1010 | 1100 | 1010 | 1100 | 1010 |
| Course 2 | Stitch | SJ | SJ | SJ | SJ | SJ | M | SJ |
| | Code | 1010 | 1010 | 1010 | 1010 | 1010 | 0000 | 1010 |
| Course 3 | Stitch | SJ | T | SJ | T | SJ | T | SJ |
| | Code | 1010 | 1100 | 1010 | 1100 | 1010 | 1100 | 1010 |
| Course 4 | Stitch | SJ | SJ | SJ | SJ | SJ | M | SJ |
| | Code | 1010 | 1010 | 1010 | 1010 | 1010 | 0000 | 1010 |

FIG. 5

| | | Wale 1 | Wale 2 | Wale 3 | Wale 4 | Wale 5 | Wale 6 | Wale 7 |
|---|---|---|---|---|---|---|---|---|
| Course 1 | Stitch | T | SJ | SJ | SJ | T | SJ | SJ |
| | Code | 1100 | 1010 | 1010 | 1010 | 1100 | 1010 | 1010 |
| Course 2 | Stitch | SJ | SJ | M | SJ | SJ | SJ | M |
| | Code | 1010 | 1010 | 0000 | 1010 | 1010 | 1010 | 0000 |
| Course 3 | Stitch | T | SJ | SJ | SJ | T | SJ | SJ |
| | Code | 1100 | 1010 | 1010 | 1010 | 1100 | 1010 | 1010 |
| Course 4 | Stitch | SJ | SJ | M | SJ | SJ | SJ | M |
| | Code | 1010 | 1010 | 0000 | 1010 | 1010 | 1010 | 0000 |

FIG. 6

|  |  | Wale 1 | Wale 2 | Wale 3 | Wale 4 | Wale 5 | Wale 6 | Wale 7 |
|---|---|---|---|---|---|---|---|---|
| Course 1 | Stitch | SJ | SJ | SJ | SJ | SJ | T | SJ |
|  | Code | 1010 | 1010 | 1010 | 1010 | 1010 | 1100 | 1010 |
| Course 2 | Stitch | SJ | M | SJ | M | SJ | M | SJ |
|  | Code | 1010 | 0000 | 1010 | 0000 | 1010 | 0000 | 1010 |
| Course 3 | Stitch | SJ | SJ | SJ | SJ | SJ | T | SJ |
|  | Code | 1010 | 1010 | 1010 | 1010 | 1010 | 1100 | 1010 |
| Course 4 | Stitch | SJ | M | SJ | M | SJ | M | SJ |
|  | Code | 1010 | 0000 | 1010 | 0000 | 1010 | 0000 | 1010 |

BINARY ENCODING OF SENSORS IN TEXTILE STRUCTURES

PRIORITY CLAIM

This application is a continuation-in-part of PCT Application No. PCT/US15/47188 filed Aug. 27, 2015, which claims the benefit of U.S. Provisional Patent Application No. 62/042,605, filed Aug. 27, 2014, the disclosures of which are incorporated herein by reference in their entireties.

TECHNICAL FIELD

The subject matter described herein relates to a sensor, system, and/or method comprising binary encoding of textile structures. Such systems and/or methods are useful for rapid prototyping of sensor designs in textiles.

BACKGROUND

In conventional approaches to development of sensors embedded in a textile fabric, measurement of responses to variable stimuli in a stitch or weave pattern tend to be qualitative. That is, properties are observed and described, with data represented along a continuum, rather than being measured at discrete points in numerical values. This approach to qualitative characterization of properties can be considered an "analog" approach. Data generated from such observations often requires extensive testing of multiples of sample for each type of sensor mechanism (resistive, capacitive, etc.) and for each variable (pressure, temperature, blood flow, etc.) to be monitored by the sensor. Therefore, such conventional approaches tend to require much work, time, and expense to produce imprecise data having limited value in designing textile sensors.

Thus, there is a need for a system and/or method for rapidly and accurately developing sensors in structures. There is a need for such a system and/or method that allows flexibility in designing textile sensors utilizing different sensing mechanisms and for monitoring and measuring different variables.

SUMMARY

Some embodiments of the subject matter described herein include a system comprising a textile sensor configured to sense a property. The textile sensor has a yarn pattern, and a binary code associated with the yarn pattern. When the textile sensor senses the property, the property alters relative positions of yarns in the yarn pattern, causing the associated binary code to change. In such a system, a particular change in the binary code represents a defined value of the property.

In some embodiments, the textile sensor further comprises a first textile sensor having a first yarn pattern, and the system can further comprise a plurality of measurements of the first textile sensor sensing the property. Each measurement comprises a different property value having a unique binary code. The system can further comprise a second textile sensor having a second yarn pattern based on the unique binary codes of the first textile sensor measurements, such that the second textile sensor provides predictable responses to different property values. In some embodiments of such a system, the unique binary codes can each be associated with a discrete alteration in relative positions of yarns in the first yarn pattern resulting from one of the different measured property values.

In other embodiments, the first yarn pattern can have a first binary code, and the second yarn pattern can have a second binary code. When the second binary code and the second yarn pattern are the same as the first binary code and the first yarn pattern, responses to different property values are the same in the first and second textile sensors. When the second binary code and the second yarn pattern are different than the first binary code and the first yarn pattern, response to a particular property value is different in the first and second textile sensors.

In certain embodiments of such a system, the textile sensor can comprise electrically conductive yarn. In such a sensor, when the property alters relative positions of yarns in the yarn pattern, conductivity of the yarn pattern changes, and a resulting binary code represents a defined level of conductivity.

In some embodiments, the textile sensor is knitted and the yarn pattern comprises a stitch pattern. In a knitted embodiment, the textile sensor can comprise a plurality of stitch types, and each type of stitch is encoded with a unique binary code. Alternatively, the textile sensor can be woven and the yarn pattern comprises a weave pattern.

When the textile sensor comprises electrically conductive yarn, yarn contact points between knit loops in the stitch pattern provide an area of relatively greater conductivity, and areas in the stitch pattern without contact between knit loops provide relatively lower conductivity. Yarn contact points can be encoded with a binary "1", and areas without contact can be encoded with a binary "0". Accordingly, the binary code for a single jersey stitch can be represented as 1010, the binary code for a miss stitch can be represented as 0000, and the binary code for a tuck stitch can be represented as 1100.

In an embodiment of a system having a knitted sensor, the stitch pattern can be weft knit, warp knit, or embroidered. In various embodiments, the textile sensor can sense properties such as pressure, force, temperature, and/or humidity. In some embodiments, the textile sensor can be integrated in a wearable garment, such as a compression garment, compression pump, burn management garment, sleeve device, and/or athletic garment.

Other embodiments of the subject matter described herein include a textile sensing system comprising a textile sensor configured to sense a property and having a yarn pattern associated with a binary code; a measuring device for measuring changes in the binary code; and a property determination module for determining a value of the sensed property. When the textile sensor senses the property, the property alters relative positions of yarns in the yarn pattern, causing the associated binary code to change. The property determination module can then determine the value of the sensed property based on a particular change in the binary code.

In such a system, the textile sensor can be knitted, and the yarn pattern can comprise a stitch pattern having a plurality of stitch types. Each type of stitch can be encoded with a unique binary code. In some embodiments of such a system, the textile sensor can be integrated in a wearable garment.

In certain embodiments of such a system, the textile sensor can comprise electrically conductive yarn. In such a sensor, when the property alters relative positions of yarns in the yarn pattern, conductivity of the yarn pattern changes, and a resulting binary code represents a defined level of conductivity.

Other embodiments of the subject matter described herein include a method comprising providing a textile sensor configured to sense a property and having a yarn pattern;

associating a binary code with the yarn pattern; applying the textile sensor to a subject having the property so that the textile sensor senses the property, wherein the property alters relative positions of yarns in the yarn pattern, causing the associated binary code to change; and correlating a particular change in the binary code with a defined value of the property.

In such a method, the textile sensor can further comprise a first textile sensor having a first yarn pattern. Such a method can further include taking a plurality of measurements of the first textile sensor sensing the property, each measurement comprising a different property value; and associating a unique binary code with each of the different measured property values. Such a method can further include designing a second textile sensor having a second yarn pattern based on the unique binary codes of the first textile sensor measurements, wherein the second textile sensor provides predictable responses to the different property values. In some embodiments, the method can further include associating each of the unique binary codes with a discrete alteration in relative positions of yarns in the first yarn pattern resulting from one of the different measured property values.

In certain embodiments of such a method, the textile sensor can comprise electrically conductive yarn. In such an embodiment, when the property alters relative positions of yarns in the yarn pattern, conductivity of the yarn pattern changes, and a resulting binary code represents a defined level of conductivity.

In such a method, the textile sensor can be knitted, and the yarn pattern can comprise a stitch pattern having a plurality of stitch types. Each type of stitch can be encoded with a unique binary code.

In a particular embodiment of a method, the textile sensor can further comprise a plurality of textile sensors, and each textile sensor can have a different yarn pattern. In such an embodiment, the method can further include taking a plurality of measurements of each textile sensor sensing the property, each measurement comprising a different property value. A unique binary code can be associated with each of the different measured property values for each textile sensor to create a database of binary codes associated with property values. Data from the database can be used to simulate responses to the different property values in a new textile sensor having various combinations of the binary codes. In this way, a new binary code for a new yarn pattern having a desired response to at least one of the property values can be determined.

Features of a sensor, system, and/or method comprising binary encoding of textile structures according to the subject matter described herein may be accomplished singularly, or in combination, in one or more of the embodiments of the subject matter described herein. As will be realized by those of skill in the art, many different embodiments of a sensor, system, and/or method comprising binary encoding of textile structures according to the subject matter described herein are possible. Additional uses, advantages, and features of the subject matter described herein are set forth in the illustrative embodiments discussed in the description herein and will become more apparent to those skilled in the art upon examination of the following.

DETAILED DESCRIPTION

As used in this description, the singular forms "a," "an," and "the" include plural referents unless the context clearly dictates otherwise. Thus, for example, the term "a yarn" is intended to mean a single yarn or more than one yarn. For the purposes of this specification, terms such as "forward," "rearward," "front," "back," "right," "left," "upwardly," "downwardly," and the like are words of convenience and are not to be construed as limiting terms. Additionally, any reference referred to as being "incorporated herein" is to be understood as being incorporated in its entirety.

The subject matter described herein includes embodiments of a sensor, system, and/or method comprising binary encoding of textile structures. Such systems and methods are useful for rapid prototyping of sensor designs in textiles. Embodiments of such systems and methods can include binary encoded sensors that are knitted, woven, or comprise other textile structures.

In an embodiment of such a system and method comprising a knitted textile structure, each type of stitch is encoded with a unique binary, or digital, data pattern. "Binary" data are expressions in the base-2 numeral system representing numeric values using one of two different symbols: 0 (zero)

and 1 (one). For purposes herein, binary data can be defined in small quantifiable units of measure for a single stitch. For example, a stitch can be represented by binary 1's and 0's, the smallest units in a digital system. The subject matter described herein further includes embodiments of a system and/or method for utilizing data generated using a binary data/stitch pattern to rapidly and accurately design textile sensors.

Figure 1:
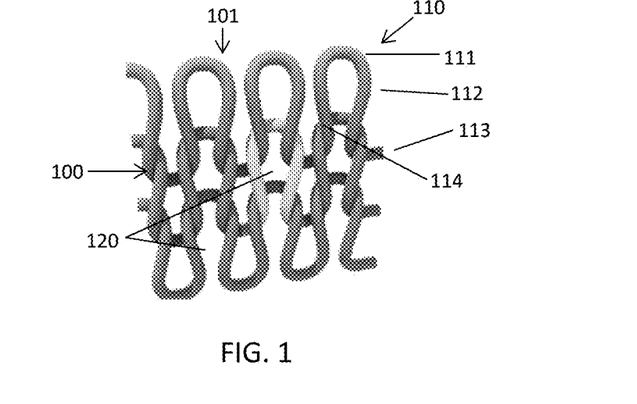
FIG. 1 is a diagram of a stitch pattern having single jersey stitches.
Figure 2:
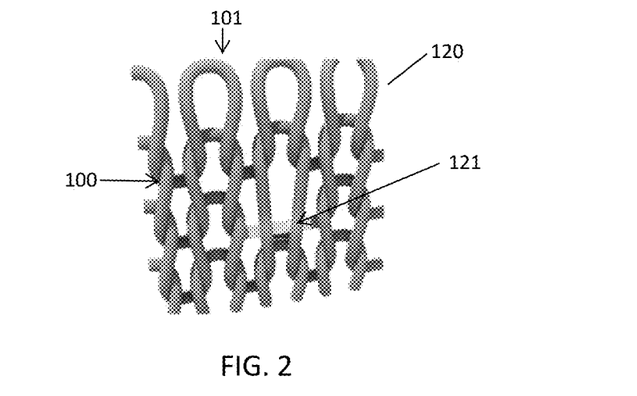
FIG. 2 is a diagram of a single jersey stitch pattern that includes a miss stitch.
Figure 3:
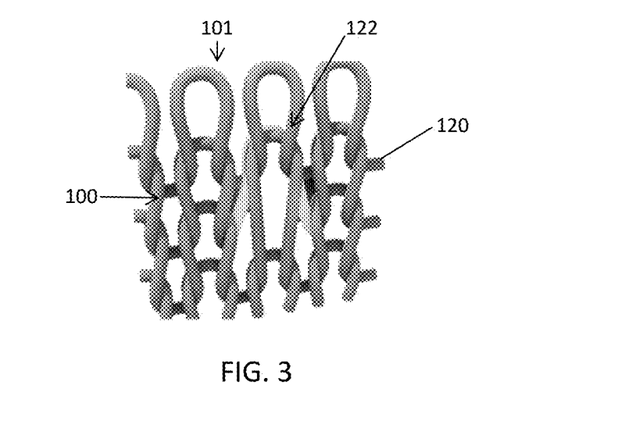
FIG. 3 is a diagram of a single jersey stitch pattern that includes a tuck stitch.

As shown in FIGS. 1-3, knitted structures comprise an interlocking series of loops 110 of one or more yarns. Knitted structures comprise stitch patterns in courses 100 and wales 101. "Course" is defined as a horizontal row of interlooped stitches running across the width of a knitted fabric. "Wale" is defined as a vertical row of interlooped stitches formed by the action of one needle in successive courses along the length of a fabric. In some embodiments of a sensor, system, and/or method comprising binary encoding of sensors, the stitch pattern and, correspondingly, the binary data pattern, are read horizontally along courses 100 across the width of a textile, or fabric.

In the area of a stitch pattern where a loop 110 is formed, the head 111, legs 112, and feet 113 of one loop 110 contact adjacent loops 110. In the area between two adjacent loops 110 in a course 100, there is no contact between yarns, which forms a "hole" 114, or space, in the knit structure. In embodiments of a system and/or method comprising binary encoding of sensors, a binary "1" can represent a loop 110, and a binary "0" can represent a hole 114. That is, a binary "1" encodes yarn contact in a knit loop 110, and a binary "0" encodes an absence of contact in a knit hole 114. Accordingly, in a stitch pattern comprising electrically conductive yarn, a binary "1" code for yarn contact in a loop 110 represents an area of decreased contact resistance and thus relatively greater conductivity. A binary "0" code for absence of yarn contact represents an area of increased contact resistance and thus relatively lower conductivity. For purposes herein, the terms "greater conductivity" and "lower conductivity" refer to relative degrees of conductivity between areas within a textile structure. In particular, the relatively "lower conductivity" in an area in a stitch pattern without contact between knit loops can mean low conductivity or no conductivity in that area.

Sensor knit structures can comprise different stitch patterns having different combinations of stitches. For example, common stitches include the single jersey (SJ) stitch 120 (as shown in FIG. 1-3), miss (M) stitch 121 (as shown in FIG. 2), and tuck (T) stitch 122 (as shown in FIG. 3). "Single jersey stitch", or plain stitch 120, is defined as a knitting stitch in which a yarn loop 110 is pulled to the technical back of a fabric. A single jersey stitch 120 produces a series of wales 101 or lengthwise ribs on the face of the fabric and courses 100, or cross-wise loops 110, on the back. "Miss stitch" 121 is defined as a knitting stitch in which at least one needle holds the old loop and does not receive any new yarn across one or more wales. A miss stitch 121 connects two loops 110 of the same course 100 that are not in adjacent wales 101. "Tuck stitch" 122 is defined as a knitting stitch in which a yarn is held in the hook of a needle and does not form a new loop.

Figure 4:
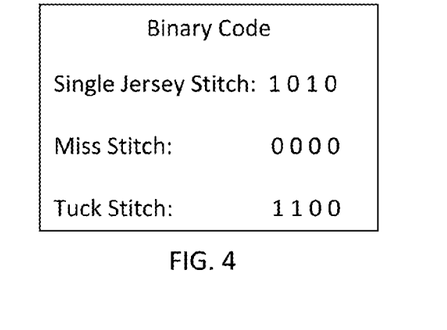
FIG. 4 is a table of a sample binary code representation for single jersey, miss, and tuck stitches in an embodiment of the subject matter described herein.

As an example of binary encoding (shown in FIG. 4), a single jersey stitch 120 can be represented as "1 0 1 0," indicating a loop 110 (1), a hole 114 (0), a loop 110 (1), and a hole 114 (0). A miss stitch 121 can be encoded as "0 0 0 0," indicating holes 114 where no new yarn is introduced across one or more wales 101. A tuck stitch 122 can be encoded as "1 1 0 0," indicating a held yarn that forms one loop 110 on top of another, followed by a hole 114 in one or more wales 101. Encoding different stitches in this manner provides a "binary data pattern" unique to the stitch pattern in a particular knit structure.

The subject matter described herein includes embodiments of a system and/or method comprising binary encoding of sensors in woven textile structures. As an example, different portions of a warp yarn in a plain weave can encode a binary 1 or a binary 0, depending on whether the warp yarn is over or under a corresponding weft yarn. Different binary values can be created by changing the over-under pattern of a warp yarn.

By representing areas (of yarn) in a knitted stitch pattern, or woven pattern, of a textile sensor as having either contact or no contact in a binary manner, the stitch pattern, or woven pattern, can be quantitated, that is, measured precisely. As a result, electrical and other properties of a sensor in a knitted or woven textile can be correlated to a binary data pattern that encodes, or represents, a particular stitch or weave pattern. For example, in a knit or weave pattern comprising electrically conductive yarn, changes in electrical resistance/conductivity in response to a certain level of a particular variable or combination of variables can be correlated to an exact binary pattern of stitches or weave pattern.

The response of the conductive fabric to a property being sensed in a subject can be simulated and predicted by studying changes to the binary patterns. Once a sufficient number of tests have been conducted with different stitch or weave patterns to establish an expected response in electrical resistance/conductivity to changes in one or more properties, or variables, a change in electrical resistance/conductivity in response to the one or more properties in another stitch or weave pattern can be predicted. In other words, a defined response in electrical resistance/conductivity to changes in one or more properties in one set of stitch or weave patterns can be extrapolated to another stitch or weave pattern. This allows developers to manipulate the binary patterns to produce a desired response to one or more properties. Different binary patterns representing different stitch patterns or different weave patterns can be combined to create different conductive fabric structures responsive to particular properties/variables. As a result, the design of knitted or woven sensors can be rapidly prototyped, thereby accelerating the development of textile-based sensor technology.

An example of how such a system and method can be applied is the determination and utilization of data related to the effects of temperature and humidity on resistance, or conductivity, in a sensor having three different stitch patterns.

Figure 5:
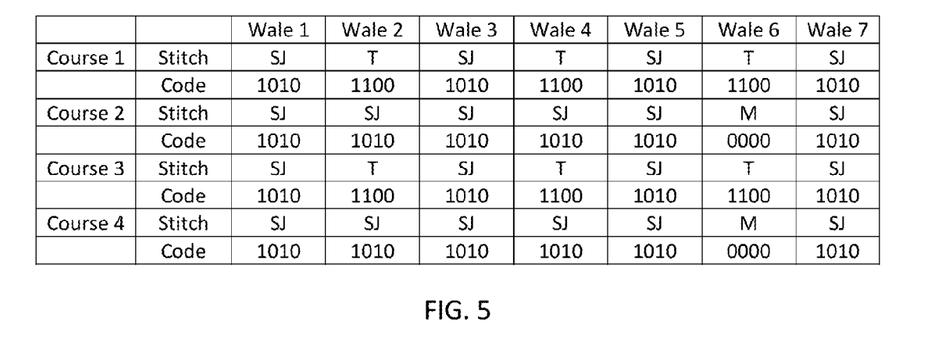
FIG. 5 is a table showing a sequence of stitches and binary code representations for those stitches in a first stitch pattern in an embodiment of the subject matter described herein.
Figure 6:
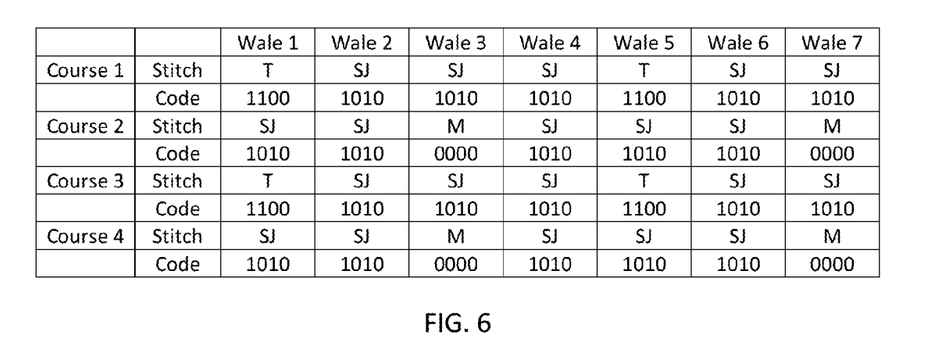
FIG. 6 is a table showing a sequence of stitches and binary code representations for those stitches in a second stitch pattern in an embodiment of the subject matter described herein.
Figure 7:
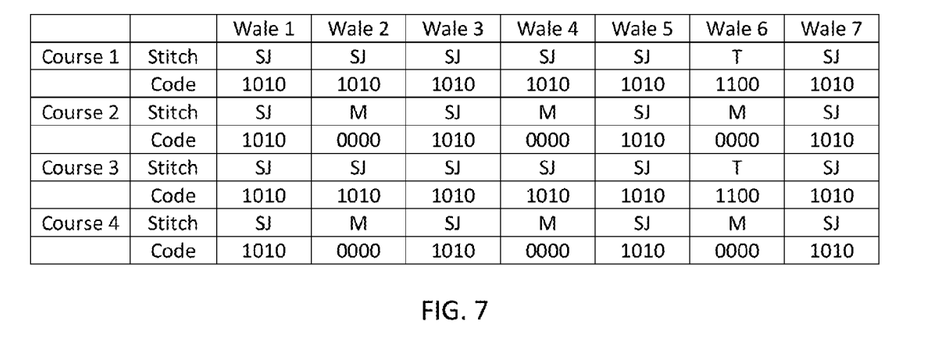
FIG. 7 is a table showing a sequence of stitches and binary code representations for those stitches in a third stitch pattern in an embodiment of the subject matter described herein.

FIGS. 5-7 show the stitches in seven adjacent wales 101 across four consecutive courses 100 in three different textile sensor structures. Each stitch is indicated as SJ (single jersey) 120, T (tuck) 122, or M (miss) 121. The binary code is shown for each stitch: single jersey 120 is represented by 1010, tuck 122 is represented by 1100, and miss 121 is represented by 0000. Accordingly, each of the three stitch patterns is encoded with 1's and 0's in a unique binary data pattern. The stitch patterns repeat across the dimensions of the particular textile sensor. As shown in FIG. 5, in a first stitch pattern, a single jersey stitch 120 pattern includes a tuck stitch 122 in every other wale 101 in alternating courses 100 and a miss stitch 121 in every sixth wale 101 in alternating courses 100. As shown in FIG. 6, in a second stitch pattern, a single jersey stitch 120 pattern includes a tuck stitch 122 in every fourth wale 101 in alternating courses 100 and a miss stitch 121 in every fourth wale 101 in alternating courses 100. As shown in FIG. 7, in a third stitch pattern, a single jersey stitch 120 pattern includes a tuck stitch 122 in every sixth wale 101 in alternating courses 100 and a miss stitch 121 in every other wale 101 in alternating courses 100.

Electrical resistance, or conductivity, can be measured for each of the three binary data/stitch patterns when the textile sensor is subjected to the same baseline temperature and humidity and to different combinations of temperature and humidity. The resulting sets of measurements establish a database of responses in electrical resistance/conductivity to changes in temperature and humidity relative to the three different binary data/stitch patterns. The measured data points can be plotted on graphs to relate the effects of variation in temperature and humidity on electrical resistance/conductivity in the three stitch patterns.

By studying the binary data patterns (and differences in those patterns) associated with variations of responses in electrical resistance/conductivity to changes in temperature and humidity for the three different stitch patterns, responses in electrical resistance/conductivity to changes in temperature and humidity in different binary data/stitch patterns can be predicted. Using binary encoding for stitch patterns allows precise measurement of responses to a particular stimulus variable (or property), which then allows quantitative analysis of those measurements to predict other responses. In this way, textile sensors can be designed and made rapidly and with accuracy. In particular, a stitch pattern (or weave pattern) having a particular measurement sensitivity, and thus a predictable response, for a certain stimulus variable under defined conditions can be readily produced for an electrically conductive textile sensor.

In some instances, the amount of data collected from actual measurements in order to establish a reliable database for predicting responses in other stitch or weave patterns can be small. In some embodiments of the subject matter described herein, the precision of data provided by using binary encoding of stitch or weave patterns allows responses in other stitch or weave patterns to be simulated to a large degree.

Stitch or weave patterns that are represented in binary fashion allow discrete, or quantitative-type, measurements. As a result, analytics (defined as the discovery and communication of meaningful patterns in data) can be utilized to quickly extract large amounts of data related to the properties of stitch or weave patterns in textile sensors. Applying analytics to binary encoded stitch or weave patterns can thus further enhance the speed at which textile sensors can be prototyped. In addition, analytics related to properties of binary encoded stitch or weave patterns can provide more precise data and a greater range of data that allows development of textile sensors having greater sensitivity and response control, optimized design of structures for customized applications, and development of new knitted or woven sensors for different purposes.

For example, as a result of quantitative-type measurements of properties in knitted or woven sensors having particular stitch or weave patterns and/or analytics related to those properties, a sensor may be developed that has greater sensitivity within a smaller range of stimuli parameters or for use in a smaller area of a textile or garment.

Figure 8:
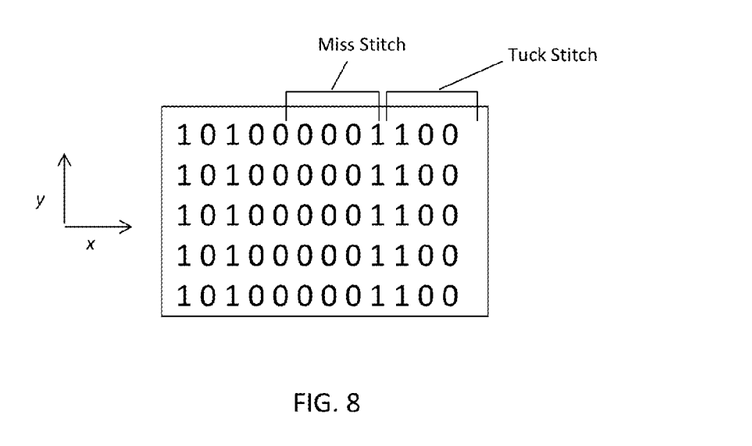
FIG. 8 is an example of binary coding of a stitch pattern in 2D fabric in an embodiment of the subject matter described herein.
Figure 9:
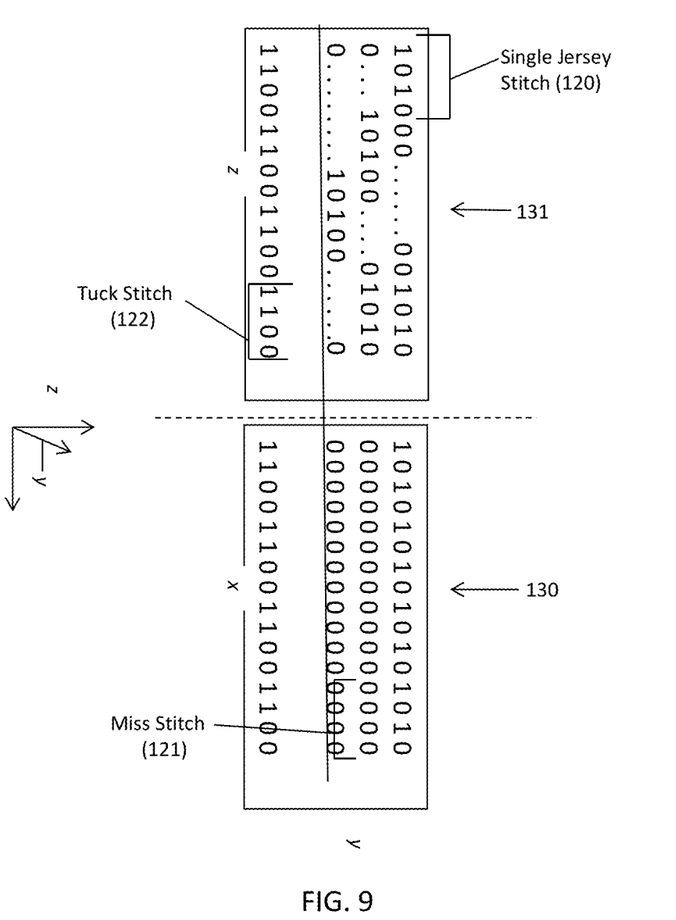
FIG. 9 is an example of binary coding of a stitch pattern in 3D fabric in an embodiment of the subject matter described herein.

Embodiments of a system and/or method for binary encoding of sensors can be utilized for sensors in both two-dimensional (2D) and three-dimensional (3D) knitted or woven structures. FIG. 8 is an illustrative embodiment of binary coding of a stitch pattern in two-dimensional fabric. In FIG. 8, the binary data pattern along the horizontal x-axis represents the stitch pattern across courses 100 in the fabric, and wales 101 in the fabric align along the vertical y-axis. FIG. 9 is an illustrative embodiment of binary coding of a stitch pattern in three-dimensional fabric. In FIG. 9, the binary data pattern along the horizontal x-axis represents the stitch pattern across courses 100 in the bottom portion 130 of the fabric, and wales 101 in the bottom portion 130 of the fabric align along the y-axis in the same plane as the x-axis. The binary data pattern in the top portion 131 of the fabric represents stitches oriented along the z-axis, which is at an approximately 90 degree angle from the plane of the bottom portion 130 of the fabric.

Embodiments of a system and/or method for binary encoding of sensors can be utilized to make textile sensors adapted to monitor and measure different types of properties, or variables. Properties/variables for which sensors can be designed include regional pressure, temperature, and force, among others.

A textile sensor having a particular stitch or weave pattern comprising a binary data pattern can be utilized to measure a variable being monitored, including changes in that variable. For example, a textile pressure sensor having a particular stitch pattern can be integrally knit into a tubular garment for wearing on a person's limb. The stitch pattern comprises a particular binary data pattern of 1's and 0's when a first amount of pressure is exerted against the sensor. As the underlying limb experiences an increase in edema, the pressure exerted against the sensor increases. Increasing pressure stretches the sensor fabric, thereby causing yarn in areas in the sensor stitch pattern where there previously were "holes" 114, or no contact, to move together so as to contact adjacent yarn loops 110 and effectively close the holes 114. Accordingly, on a display screen showing the pressure sensor binary data pattern, the 0's (representing holes in the stitch pattern) would change to 1's (representing yarn contact and increased conductivity) in the areas experiencing increased pressure. The number of 0's that change to 1's can be correlated to a certain amount of increase in pressure. The total number of 1's and 0's in the pressure sensor binary data pattern can be correlated to the actual pressure exerted on the sensor at any given time.

In some embodiments, the system and/or method for binary encoding of sensors can be utilized to design textile sensors that operate in various ways. For example, a textile sensor may be designed, or made, to measure resistance, capacitance, or inductance. In another embodiment, a textile sensor may be designed to operate as a piezoelectric sensor.

Representing a stitch or weave pattern with a binary data pattern allows precise measurement of sensor response to variables being monitored. Thus, in some embodiments, such detailed data relating to stitch or weave pattern properties can be utilized to make fine control manipulations in sensor design and manufacture. For example, in the same small-sized textile sensor, one area of the sensor can be used to measure pressure, while another area of the sensor can be used to measure temperature and/or humidity. That is, since the behavior of each of the 1's and 0's in a binary data pattern can be captured in a quantitative manner, various manipulations of individual 1's and 0's—and the areas within a stitch or weave they represent—can be accomplished in close proximity so as to design a plurality of sensor functions in a relatively small area.

In other embodiments, such precise measurement of sensor response to variables correlated with a particular binary data pattern allows placement of sensors at many different locations in a fabric. Such flexibility creates various options for customizing sensor type and placement for individual users. For example, athletes in one sport may prefer to monitor heart rate and blood flow in one area of the body, while athletes in a different sport prefer to monitor oxygenation and blood flow in a different area of the body.

In some embodiments, binary data patterns representing particular stitch or weave patterns and correlated with certain responses to stimuli in the stitch or weave pattern allows design of different types of sensors in the same area of a textile. For example, a textile sensor area can comprise two layers of fabric, such as when one layer is plated onto another layer. One layer of the fabric can comprise a sensor for a first property variable stimulus, and the second layer of the fabric can comprise a sensor for a second property variable stimulus.

In a textile comprising a knitted or woven sensor, a measure (such as an amount or degree) of a variable can be sensed by an electrically conductive yarn and converted to an electrical signal representative of the sensed value. Embodiments of the system and/or method for binary encoding of sensors in knitted or woven structures can be utilized with any type of conductive yarn, for example, an electrically conductive silver yarn or a yarn coated with silver.

Control of conductivity in electrically conductive yarn allows a textile structure to act as a sensor. Control of conductivity can allow a knitted or woven sensor to function effectively in a variety of sensing applications; allow the type of signal being sensed to be enhanced so as to provide more accurate sensing and signal transmission; and allow control of the size and shape of the sensor.

Conductivity properties in a textile sensor or circuit for transmitting a sensed value can vary depending on a number of factors, including the type of electrically conductive yarn, yarn size (denier), yarn construction, amount of yarn in a given area (yarn/fabric density), and stitch or weave pattern. Such factors can be balanced in a textile structure to achieve conductivity in the sensor or circuit suitable for reliably sensing and/or transmitting signals. As a result, the type of variables being monitored and the manner in which those variables are monitored can be controlled. In some embodiments of the subject matter described herein, binary encoding of a stitch or weave pattern and analyzing data generated using a binary data/stitch or weave pattern allows such conductivity factors to be taken into account in the design of sensors.

In certain embodiments, the binary encoding system and method can be utilized with elastic yarn/fabric. For example, when an electrically conductive material is coated on the exterior of an elastic yarn or an electrically conductive yarn is plated onto an elastic yarn, a stitch or weave pattern can be encoded in binary fashion for the electrically conductive component. Accordingly, responses in the stitch or weave pattern can be measured precisely and reliably predicted for when the sensor is exposed to the same stimulus again.

In embodiments of the system and/or method for binary encoding of sensors, the textile and the embedded, or integrated, sensors can be knit on a circular knitting machine or a flatbed knitting machine. The textile and embedded sensors can be weft knit in the horizontal direction or warp knit in the vertical direction.

In certain embodiments, the binary encoding system and method can be utilized with embroidery-type sensors. Embroidery can be defined as a fabric work comprising accessory stitches, in which thread, yarn, or other flexible material that is not part of the textile structure passes through a textile. That is, a textile sensor can be fabricated using accessory stitches in a manner similar to that for creating embroidery. Certain embroidery machines can be programmed for stitching having various stitch types, sizes, tensions, and patterns utilizing different materials, including conductive and non-conductive fibers and yarns. Thus, a binary encoded sensor stitch pattern in accordance with embodiments of the subject matter described herein can be advantageously utilized to program such an embroidery machine for rapid construction of a prototype sensor or for commercial production of textile sensors.

In some embodiments, an embroidery-type textile sensor can be fabricated as a stand-alone structure for use as a sensor product or in a sensor product. In other embodiments, an embroidery-type textile sensor can be constructed in conjunction with a sensor structure knitted into a fabric. In addition, a sewing machine can be used to construct a textile sensor from a binary encoded sensor stitch pattern. Alternatively, a sewing machine can be used to join multiple embroidery-type sensors together to form a single textile sensor from a binary encoded sensor stitch pattern. In such embodiments, an embroidery-type textile sensor can be added to a fabric after construction.

Embodiments of a sensor, system, and/or method comprising binary encoding of textile structures can be utilized in various applications. Such textile sensors can be rapidly and accurately developed for particular uses. For example, one such use of a textile sensor having precise measurement capability is in healthcare monitoring. Such sensors can be used to monitor chronic medical conditions, such as vascular insufficiency and heart disease, as well as in long-term monitoring applications, such as for wounds or tumors. Another use of such a textile sensor is in environmental monitoring.

Rapid prototyping of sensor designs allows customization both in the sensors themselves and in garments comprising such sensors. Binary data pattern interpretation can be used to create custom sensors that have particular measurement sensitivities and/or that can measure more than one variable. Enhanced sensor design processes provided by embodiments of the subject matter described herein allow creation of custom wearable garments that incorporate textile embedded sensors, for example, an array of sensors for monitoring different variables, and/or placement of sensors at particular desired locations for individuals. For example, rapid and accurate development capabilities allow design of a textile sensor that can be integrated into an athletic garment for monitoring different physiological parameters of athletes in different kinds of athletic competition.

The discrete baseline data sets generated from measuring electrical and other properties in binary encoded stitch or weave patterns provide a means for understanding whether a later response to a particular stimulus is expected. By comparing actual responses at numerous locations in a textile sensor to a defined range of expected responses, the functional status of the sensor can be monitored. In this way, embodiments of a system and method for binary encoding of textile sensors can be utilized as a means of quality control for such a sensor. The quality control aspect of such a system and method can be used during sensor development, as well as during manufacturing. In addition, monitoring the actual versus expected response of a textile sensor in operation on a wearer can provide an accurate indication of whether the sensor is performing correctly, or not giving false readings. Likewise, accurate monitoring of a sensor's performance over time can provide information about the remaining life cycle of the sensor.

In another aspect of the subject matter described herein, the binary code of the stitch or weave pattern in a textile sensor can change in response to a change in a property or variable being sensed. Thus, the change in binary code of the stitch or weave pattern can be correlated to the change in a property or variable. The stitch or weave pattern in a textile sensor has a neutral, or steady state, binary code when a variable is not acting on the sensor and the sensor is at rest. The steady state binary code can be pre-determined prior to applying the sensor to a subject to be sensed. In addition, a baseline binary code of the stitch or weave pattern can be measured when the sensor is initially applied to a subject. The baseline binary code can be correlated to an initial value of the property or variable being sensed.

When the sensor is placed in operation and the property or variable acts on the sensor (for example, stretches the sensor), the stitch or weave pattern of the sensor changes in response. With the change in stitch or weave pattern caused by the action of the property or variable on the textile sensor, the binary code likewise changes to represent the changed stitch or weave pattern in the sensor. The binary code representing the changed stitch or weave pattern in the sensor can be compared to the neutral/steady state binary code and the baseline binary code. The change in the binary code as a result of action of the variable on the sensor can thus represent a value of change in the variable. In this way, a textile sensor having a binary encoded stitch or weave pattern can be utilized to quickly and accurately measure a property or variable of a subject.

Figure 10:
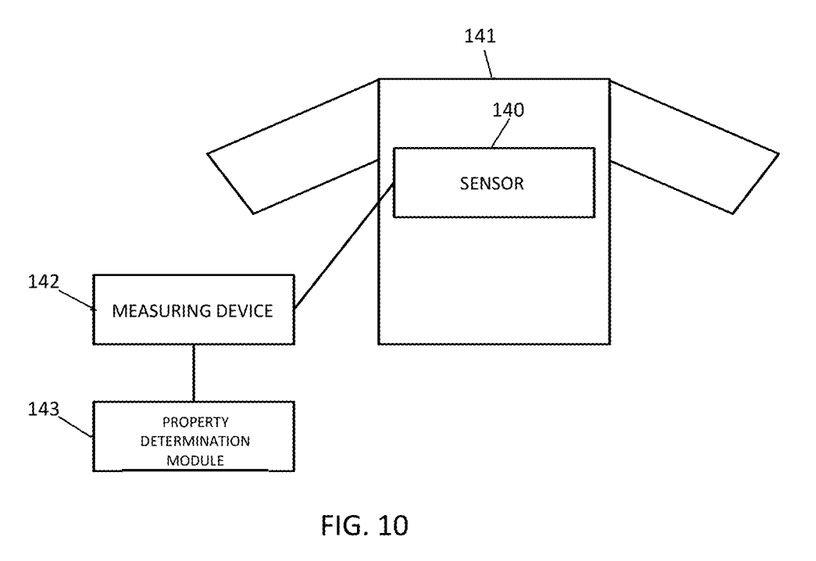
FIG. 10 is a block diagram illustrating a system for sensing a property using a sensor comprising a stitch pattern having a particular binary code according to an embodiment of the subject matter described herein.

In an exemplary embodiment, a textile sensing system according to the subject matter described herein can be incorporated into a wearable garment. As shown in FIG. 10, a textile sensor 140 that encodes binary data in one or more stitch patterns can be incorporated into a garment 141. The textile sensor 140 can comprise electrically conductive yarns and have a steady state binary code and a baseline binary code, each of which are correlated with a discrete conductivity in the sensor 140. A measuring device 142, such as a multimeter or device with similar functionality, can measure a property, for example, an electrical property such as conductivity, of the sensor 140. Other electrical properties that can be measured include, for example, resistance, inductance, capacitance, etc. The measuring device 142 can also read binary values encoded by the sensor 140 stitch pattern at steady state, at baseline, and for any change in conductivity in the sensor 140. The measuring device 142 can be connected to the sensor 140 through a wired or wireless connection. A property determination module 143 can determine a value of a sensed property, such as temperature or an amount of pressure applied to the sensor 140 in the garment 141. The property determination module 143 can be implemented in hardware, firmware, software executed by a processor, or any combination thereof.

A change in temperature or pressure causes movement of stitches in electrically conductive yarns in the stitch pattern of the sensor 140 so as to change conductivity in the sensor 140. As yarns in the stitch pattern move relative to each other, the binary code of the stitch pattern changes in a corresponding and predictable manner. In this way, a particular value of a measured property (temperature or pressure) can be quickly and accurately read by observing the binary code of the stitch pattern having the changed conductivity. The binary code of a stitch pattern changed due to measured change in a property can be referred to as a "measurement binary code."

In certain embodiments of such a textile sensing system, the measured property (for example, temperature or pressure) value can be compared to prior measurements of property changes in the same or different subjects for the same stitch pattern. Such data can be utilized to create models that provide expected changes in a property based on a change in measurement binary code relative to steady state and/or baseline binary code. As a result, more accurate measurements of a property or variable can be made.

Embodiments of a sensor, system, and/or method comprising binary encoding of textile structures can provide advantages over conventional approaches to sensor development. For example, by encoding stitch or weave patterns in a binary manner, developers can manipulate the binary patterns to produce a desired response to one or more variables. Different binary patterns representing different stitch or weave patterns can be combined to create different conductive fabric structures responsive to particular variables. As a result, the design of knitted or woven sensors can be rapidly prototyped, thereby accelerating the development of textile-based sensor technology.

Although in the example in FIG. 10, the garment 141 appears as a shirt designed to fit over the trunk of a wearer, the subject matter described herein is not limited to using sensors having stitch or weave-encoded binary values in shirts. A sensor as described herein may be utilized in garments or bandages worn at any location on the body. A sensor as described herein may be used in any textile or fabric structure or in any device utilizing a sensor comprising a textile or fabric within the design. Textile structures in which a sensor as described herein may be embedded include, for example, compression garments, such as anti-embolism stockings and vascular hosiery, useful in treating vascular conditions or lymphedema; garments useful in managing burns; sleeve devices; and compression pumps.

The subject matter described herein can be implemented in software in combination with hardware and/or firmware. For example, the subject matter described herein can be implemented in software executed by a processor. In one exemplary implementation, a binary encoded textile sensor can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Additional Features

Figure 11A:
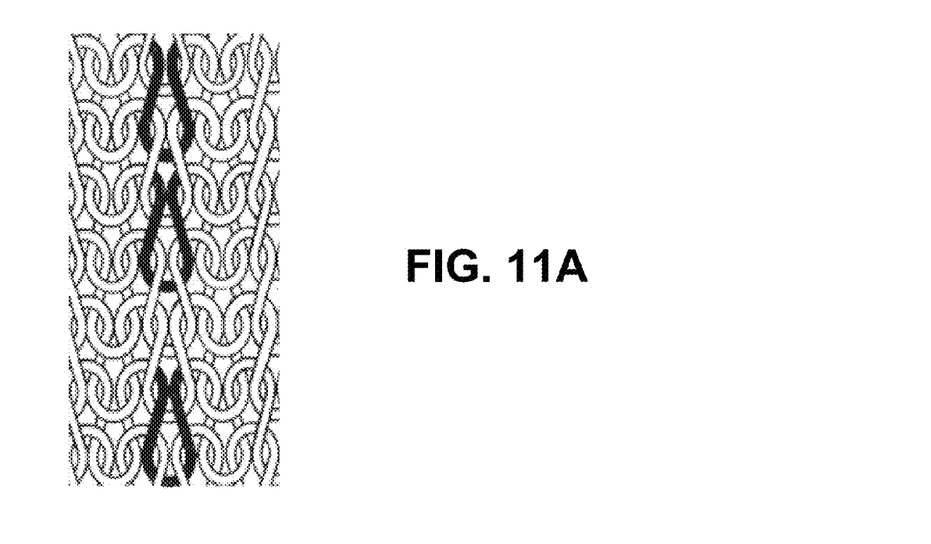
FIGS. 11A-11C illustrate examples of textile structures incorporating yarns that are skip coated with conductive material according to an embodiment of the subject matter described herein.
Figure 11B:
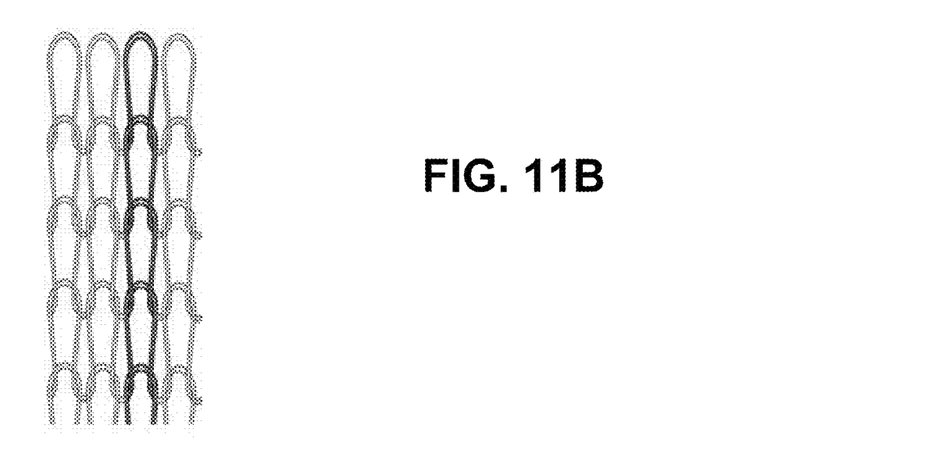
Figure 11C:
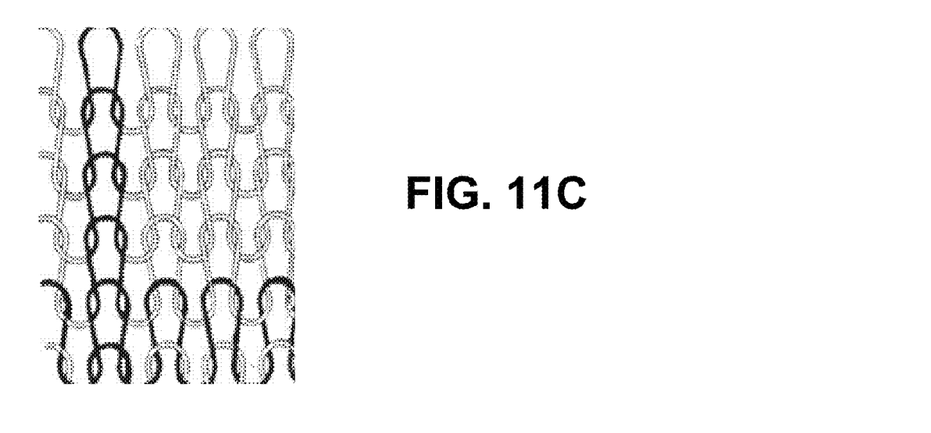

Flexibility with a knitted or woven stitch construction is desired to provide the maximum range of conductive digital properties of the structure. Intermittent conductive yarns can be constructed to control the digital process. A yarn can be constructed so that the conductive material, such as silver, is applied to the yarn with a skip coating structure. For example a yarn is coated with silver for 1 cm, the yarn is free from coating for 1 cm. Besides the conductive coating, the yarn may be otherwise non-conductive. This yarn can be fed into a textile structure with a controlled process such as an electric eye incorporated into the knitting machine utilizing a dial needle to accurately place the yarn. FIGS. 11A-11C illustrate the incorporation of skip coated yarns into knitted fabrics, where the yarns have conductive coatings selectively applied to a portion of the length of each yarn. In FIG. 11A, the portions of the yarns shown with black fill represent the portions of the yarns that are coated with a conductive coating and the portions without a fill color represent portions of each yarn that are not coated with a conductive coating and are thus non-conductive. In FIG. 11A, loops of yarn in a column have conductive coating selectively applied. If a conductively coated portion encodes a binary 1 and a non-conductive portion encodes a binary 1, the column in FIG. 11A with the conductively coated yarn portions may encode "101001" in binary.

In FIG. 11B, the portions of the yarns shown with darker outlining represent conductively coated portions of the yarns, and the portions of the yarns with lighter outlining represent uncoated, non-conductive portions of the yarns. Continuing with the example where a conductive portion of a yarn encodes a binary 1 and a non-conductive portion encodes a binary 0, the structure in FIG. 11B, may encode "11111" in binary when reading down the column where the conductively coated yarn portions appear. Alternatively, a conductive column in the fabric in FIG. 11B may encode a binary 1 and a non-conductive column may encode a binary 0. Thus, reading from left to right, the columns in FIG. 11B may encode "0010" in binary.

In FIG. 11C, conductively coated portions of the yarns are shown with black fill and non-conductive, uncoated portions are shown with no fill color. FIG. 11C illustrates that conductively coated yarn portions can extend across rows and columns of stitches in a knitted fabric and can likewise be read across rows and columns. In one example, a single column or a single row of conductively coated portions can be read together as a single binary 1, and a non-conductive row or column can be read as a binary 0. Thus, in FIG. 11C, reading from left to right across the columns, the columns in the structure may encode "01000" in binary. Similarly, reading from top to bottom, the rows in the structure may encode "00001" in binary.

Figure 12A:
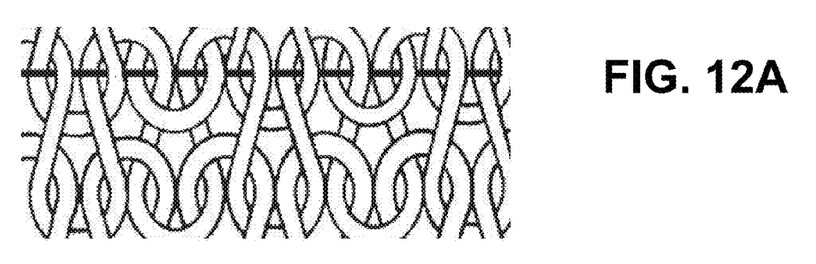
FIGS. 12A-12C illustrate examples of textile structures where non-adjacent skip coated portions of yarns are electrically connected to each other using a conductive yarn incorporated into the textile structures using a laid in process according to an embodiment of the subject matter described herein.
Figure 12B:
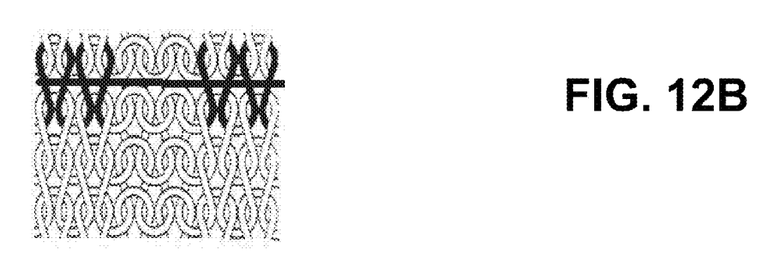
Figure 12C:
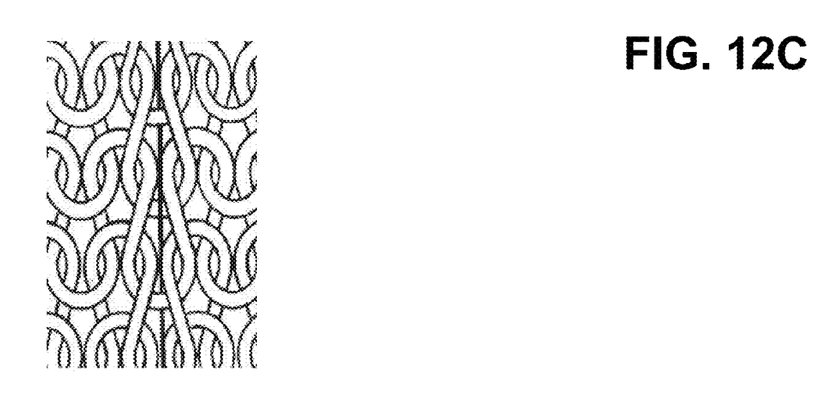

Yarns can also be utilized that are electroactive polymers. By supplying current through the yarn, the yarns can be controlled to interact with the surrounding conductive structure in a predetermined manner. Examples of electoactive polymers and their use for sensing are described in Electoactive Polymers for Sensing, http://rsfs.royalsocietypublishing.org/content/6/4/20160026 (17 Jun. 2016), the disclosure of which is incorporated herein by reference in its entirety. According to another aspect of the subject matter described herein, multiple non-adjacent digital sensors can be connected horizontally by utilizing a laid in process with a conductive yarn. FIGS. 12A-12C illustrate this aspect. Referring to FIG. 12A, the yarn shown with black fill represents a conductive yarn incorporated into a row of stitches in a knitted fabric using a laid in process. In FIG. 12B, the yarn shown with dark fill represents a conductive yarn that interconnects non-adjacent sensors, also shown in dark fill, in a row of stitches in the knitted fabric.

A conductive yarn can also be inserted by using a dial needle for a vertical conductive connection. In FIG. 12C, the yarn shown in dark fill represents a conductive yarn inserted vertically in a column of a knitted fabric. Such a yarn can be used to interconnect non-adjacent sensors or other conductive structures that extend along a column of the fabric, in the same manner illustrated in FIG. 12B for rows.

Figure 13:
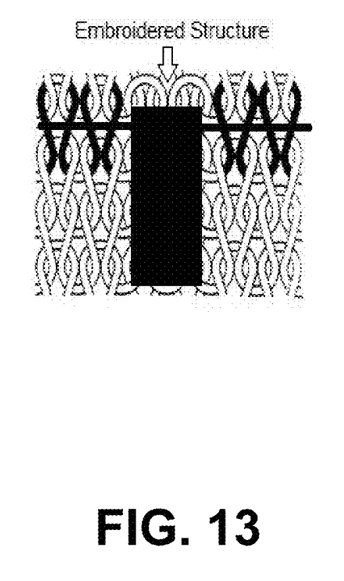
FIG. 13 illustrates an example of an embroidered structure that is electrically connected to other conductive structures in a row of textile fabric using a conductive yarn incorporated into the fabric using a laid in process.

According to yet another aspect of the subject matter described herein, embroidered structures can also be constructed to provide a digital structure to function as a single data device or in conjunction with a digital pattern knitted or woven into the fabric structure. FIG. 13 illustrates an example of a fabric with an embroidered structure conductively connected to other conductive structures. In FIG. 13, the embroidered structure may be a sensor or other type of electrical circuit. The embroidered structure may be conductive and connected to other conductive structures via a laid-in conductive yarn that extends along a row or column in the fabric. Other conductive structures may be formed by stitches of conductive fabric electrically connected to the embroidered structure via the laid-in yarn. Although the subject matter described herein has been described with reference to particular embodiments, it should be recognized that these embodiments are merely illustrative of the principles of the subject matter described herein. Those of ordinary skill in the art will appreciate that a system and/or method for binary encoding of sensors in textile structures of the subject matter described herein may be constructed and implemented in other ways and embodiments. Accordingly, the description herein should not be read as limiting the subject matter described herein, as other embodiments also fall within the scope of the subject matter described herein.

What is claimed is:

1. A system, comprising:
    a textile sensor configured to sense a property and having a yarn pattern that encodes a binary code; and
    wherein when the textile sensor senses the property, the property alters relative positions of yarns in the yarn pattern, causing the associated binary code to change, and
    wherein a particular change in the binary code represents a defined value of the property, wherein the textile sensor is knitted, and the yarn pattern comprises a stitch pattern.

2. The system of claim 1, wherein the textile sensor comprises a first textile sensor having a first yarn pattern, and:
    wherein the first textile sensor is measurable to produce a plurality of measurements indicative of the property, each measurement comprising a different property value having a unique binary code; wherein the system further comprises:
    a second textile sensor having a second yarn pattern based on the unique binary codes of the first textile sensor measurements, and
    wherein the second textile sensor provides predictable responses to different property values.

3. The system of claim 2, wherein the unique binary codes are each associated with a discrete alteration in relative positions of yarns in the first yarn pattern resulting from one of the different measured property values.

4. The system of claim 2, the first yarn pattern having a first binary code and the second yarn pattern having a second binary code,
    wherein the second binary code and the second yarn pattern are the same as the first binary code and the first yarn pattern,
    whereby responses to different property values are the same in the first and second textile sensors.

5. The system of claim 2, the first yarn pattern having a first binary code and the second yarn pattern having a second binary code,
    wherein the second binary code and the second yarn pattern are different than the first binary code and the first yarn pattern,
    whereby a response to a particular property value is different in the first and second textile sensors.

6. The system of claim 1, wherein the textile sensor comprises electrically conductive yarn,
    wherein when the property alters relative positions of yarns in the yarn pattern, conductivity of the yarn pattern changes, and wherein a resulting binary code represents a defined level of conductivity.

7. The system of claim 1 comprising a conductive yarn incorporated into a fabric using a laid in process, wherein the conductive yarn electrically connects non-adjacent sensors in the fabric.

8. The system of claim 7 comprising an embroidered structure incorporated into the fabric, wherein the embroidered structure is electrically connected to the conductive yarn incorporated into the fabric using the laid in process.

9. The system of claim 1, wherein the textile sensor comprises a plurality of stitch types, and each type of stitch is encoded with a unique binary code.

10. The system of claim 1, the textile sensor further comprising electrically conductive yarn, wherein yarn contact points between knit loops in the stitch pattern provide an area of relatively greater conductivity and areas in the stitch pattern without contact between knit loops provide relatively lower conductivity, wherein yarn contact points are encoded with a binary 1 and areas without contact are encoded with a binary 0.

11. The system of claim 10, wherein the binary code for a single jersey stitch comprises 1010, the binary code for a miss stitch comprises 0000, and the binary code for a tuck stitch comprises 1100.

12. The system of claim 1, wherein the stitch pattern is weft knit, warp knit, or embroidered.

13. The system of claim 1, wherein the property is selected from a group consisting of pressure, force, temperature, and humidity.

14. The system of claim 1, wherein the textile sensor is comprised in a two-dimensional fabric.

15. The system of claim 1, wherein the textile sensor is comprised in a three-dimensional fabric.

16. The system of claim 1, wherein the textile sensor is integrated in a wearable garment.

17. The system of claim 16, wherein the wearable garment is selected from a group consisting of a compression garment, compression pump, burn management garment, sleeve device, and athletic garment.

18. The system of claim 1 wherein the yarns are skip coated with a conductive material such that portions of the yarns are coated with the conductive material and portions of the yarn are not coated with the conductive material.

19. The system of claim 18 wherein the coated and uncoated portions of the yarns encode the binary code.

20. The system of claim 1 wherein at least some of the yarns comprise electroactive polymers.

21. A system, comprising:
a textile sensor configured to sense a property and having a yarn pattern that encodes a binary code; and
wherein when the textile sensor senses the property, the property alters relative positions of yarns in the yarn pattern, causing the associated binary code to change, and
wherein a particular change in the binary code represents a defined value of the property, wherein the textile sensor is woven, and the yarn pattern comprises a weave pattern.

22. A textile sensing system, comprising:
a textile sensor configured to sense a property and having a yarn pattern associated with a binary code;
a measuring device for measuring changes in the binary code; and
a property determination module for determining a value of the sensed property,
wherein when the textile sensor senses the property, the property alters relative positions of yarns in the yarn pattern, causing the associated binary code to change, and
wherein the property determination module determines the value of the sensed property based on a particular change in the binary code.

23. The system of claim 22, wherein the textile sensor is knitted, the yarn pattern comprises a stitch pattern comprising a plurality of stitch types, and each type of stitch is encoded with a unique binary code.

24. The system of claim 22, wherein the textile sensor comprises electrically conductive yarn,
wherein when the property alters relative positions of yarns in the yarn pattern, conductivity of the yarn pattern changes, and
wherein a resulting binary code represents a defined level of conductivity.

25. The system of claim 22, wherein the textile sensor is integrated in a wearable garment.

26. A method, comprising:
providing a textile sensor configured to sense a property and having a yarn pattern;
associating a binary code with the yarn pattern;
applying the textile sensor to a subject having the property so that the textile sensor senses the property, wherein the property alters relative positions of yarns in the yarn pattern, causing the associated binary code to change; and
correlating a particular change in the binary code with a defined value of the property, wherein the textile sensor is knitted, the yarn pattern comprises a stitch pattern comprising a plurality of stitch types, and each type of stitch is encoded with a unique binary code.

27. The method of claim 26, wherein the textile sensor comprises a first textile sensor having a first yarn pattern, and wherein the method further comprises:
taking a plurality of measurements of the first textile sensor sensing the property, each measurement comprising a different property value;
associating a unique binary code with each of the different measured property values; and
designing a second textile sensor having a second yarn pattern based on the unique binary codes of the first textile sensor measurements, wherein the second textile sensor provides predictable responses to the different property values.

28. The method of claim 27, further comprising associating each of the unique binary codes with a discrete alteration in relative positions of yarns in the first yarn pattern resulting from one of the different measured property values.

29. The method of claim 26, wherein the textile sensor comprises electrically conductive yarn,
wherein when the property alters relative positions of yarns in the yarn pattern, conductivity of the yarn pattern changes, and
wherein a resulting binary code represents a defined level of conductivity.

30. The method of claim 26, the textile sensor further comprising a plurality of textile sensors, each textile sensor having a different yarn pattern, the method further comprising:
taking a plurality of measurements of each textile sensor sensing the property, each measurement comprising a different property value;

associating a unique binary code with each of the different measured property values for each textile sensor to create a database of binary codes associated with property values;

using the database to simulate responses to the different property values in a new textile sensor having various combinations of the binary codes; and determining a new binary code for a new yarn pattern having a desired response to at least one of the property values.

* * * * *